United States Patent [19]
Schoultz

[11] Patent Number: 5,942,353
[45] Date of Patent: Aug. 24, 1999

[54] BATTERY WITH REPLACEABLE CELLS

[76] Inventor: Roger A. Schoultz, 190 N. Meridan #59, Rialto, Calif. 92376

[21] Appl. No.: 08/861,836

[22] Filed: May 22, 1997

[51] Int. Cl.$^6$ ........................................................ H01M 2/30
[52] U.S. Cl. ........................... 429/149; 429/123; 429/163; 429/178; 429/158
[58] Field of Search ..................................... 429/123, 149, 429/163, 178, 187, 157, 158, 159, 160, 161

[56] References Cited

U.S. PATENT DOCUMENTS

| | | | |
|---|---|---|---|
| 4,347,294 | 8/1982 | Mejia | 429/151 |
| 4,418,127 | 11/1983 | Shambaugh et al. | 429/8 |
| 5,256,502 | 10/1993 | Kump | 429/150 |
| 5,378,552 | 1/1995 | Dixon, Jr. | 429/91 |
| 5,565,283 | 10/1996 | Chalasani et al. | 429/187 |

*Primary Examiner*—Maria Nuzzolillo
*Assistant Examiner*—Angela J. Martin
*Attorney, Agent, or Firm*—David L. Volk

[57] ABSTRACT

A plurality of battery cells are each contained within a separate casing. Each cell has a positive terminal and a negative terminal, each terminal comprising a threaded post extending outwardly from the casing. A battery cable adapter is provided for electrical connection of the terminal to a battery cable. A conductive bar includes a first aperture configured to receive one of the posts of one of the cells, and a second aperture configured to receive one of the posts of an adjacent one of the cells. Nuts threadedly engage the posts to engage the conductive bar securely to the posts. An insulated connector cap is configured to cover the conductive bar and the posts received within the first and second apertures of the bar. A holder is configured to receive the cells together in an adjoining manner wherein at least one of the terminals of each of the cells is adjacent one of the terminals of an adjacent one of the cells. The cells may be electrically connected together in series fashion using the conductive bars to form a single, multi-celled battery. Each of the casings includes a coverable opening through which the electrolyte solution within the cell is replaceable. Side mount cable adapters connect to the posts to permit side mount battery cables to be connected to the terminals.

7 Claims, 4 Drawing Sheets

5,942,353

BATTERY WITH REPLACEABLE CELLS

BACKGROUND OF THE INVENTION

1. Field of the Invention

The present invention relates to batteries, particularly to multi-cell batteries.

2. Description of the Related Art

Multi-celled batteries are used for multiple purposes, such as in automobiles, golf carts, and in uninterrupted power systems. Until the present invention, if a single cell of a battery would fail, the entire battery had to be replaced.

SUMMARY OF THE INVENTION

The battery with replaceable cells of the present invention includes a plurality of battery cells, each contained within a separate casing. Each cell has a positive terminal and a negative terminal, each terminal comprising a threaded post extending outwardly from the casing. A conductive cap is configured to engage the post for electrical connection of a battery cable to the terminal.

A conductive bar includes a first aperture configured to receive one of the posts of one of the cells, and a second aperture configured to receive one of the posts of an adjacent one of the cells. Nuts threadedly engage the posts to engage the conductive bar securely to the posts. An insulated connector cap is configured to cover the conductive bar and the posts received within the first and second apertures of the bar.

A holder is configured to receive the cells together in an adjoining manner wherein at least one of the terminals of each of the cells is adjacent one of the terminals of an adjacent one of the cells. The cells may be electrically connected together in series fashion using the conductive bars to form a single, multi-celled battery.

Each of the casings includes a coverable opening through which the electrolyte solution within the cell is replaceable. Side mount cable adapters connect to the posts to permit side mount battery cables to be connected to the terminals.

Because each cell is in an individual casing, because all the casings are of the same shape, and because the cells include terminals which are each electrically connectable to one another and to battery cables, the present invention provides a multi-cell battery in which a single replacement cell may be placed in any position within the battery. Such an arrangement is convenient and makes the stocking of replacement parts less expensive than with other batteries and battery systems.

Still further features and advantages will become apparent from the ensuing description and drawings.

DETAILED DESCRIPTION

Figure 1:
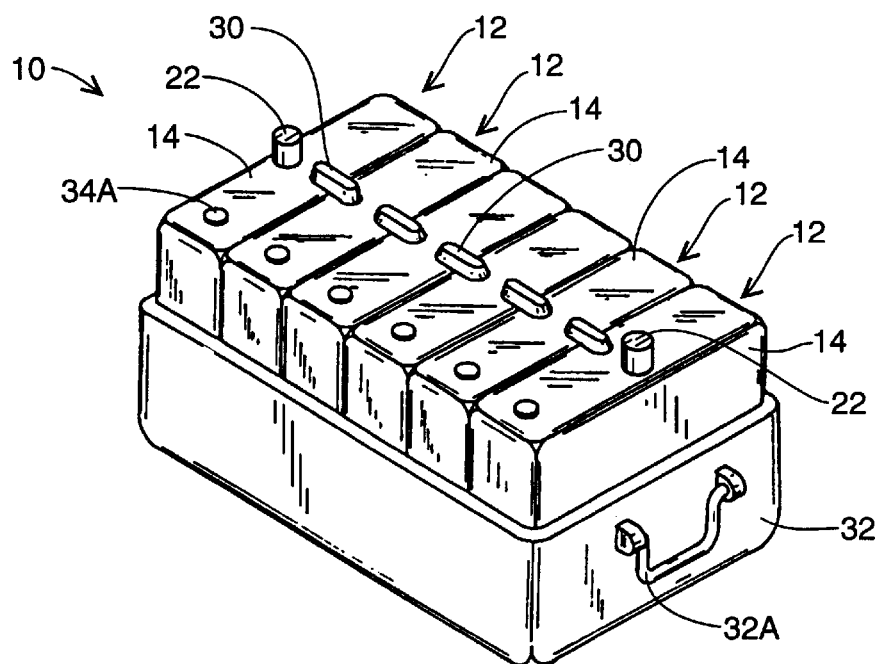
FIG. 1 is a perspective view of the battery system of the present invention.
Figure 2:
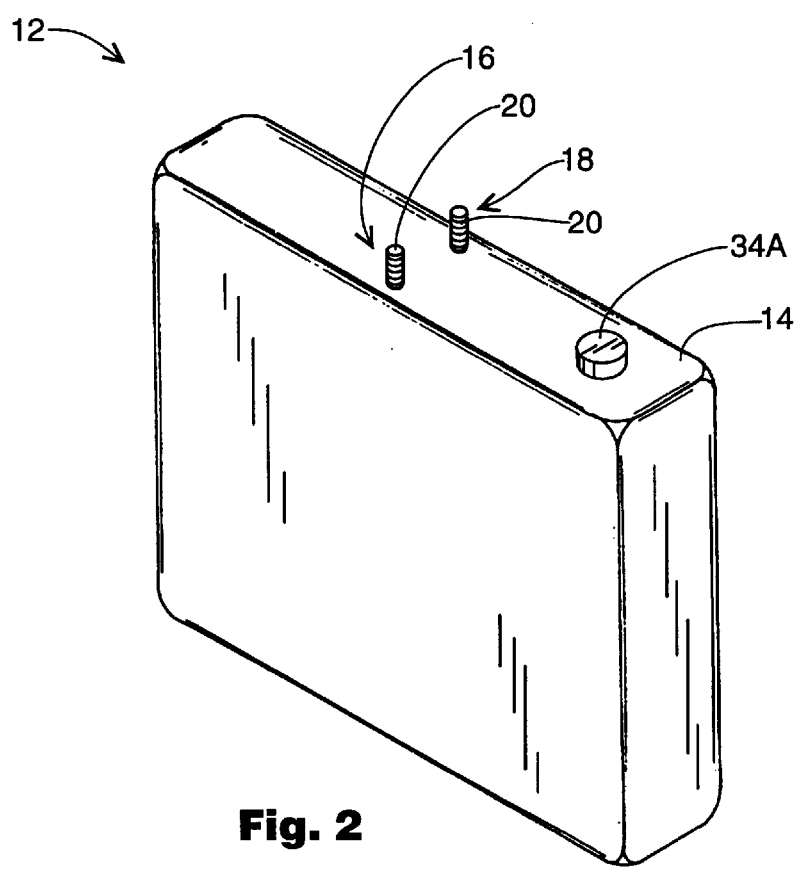
FIG. 2 is a perspective view of a single cell.

FIG. 1 is a perspective view of the battery system 10 of the present invention. A plurality of battery cells 12 are each contained within a separate casing 14. FIG. 2 is a perspective view of a single cell 12. Referring to FIGS. 1 and 2, each cell 12 has a positive terminal 16 and a negative terminal 18. Each terminal 16, 18 comprises a threaded post 20 extending outwardly from the casing 14.

Figure 3:
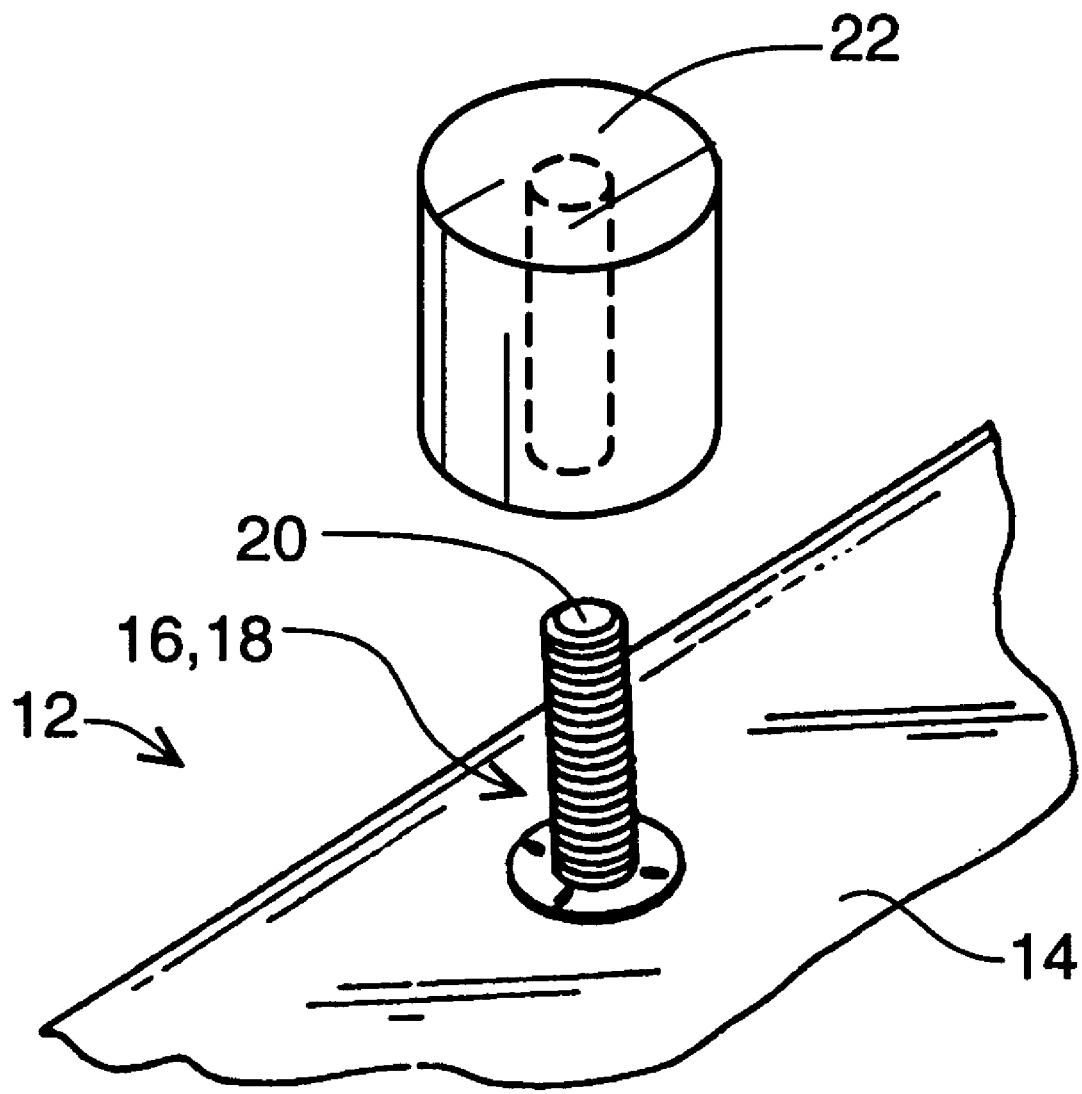
FIG. 3 is a partial enlarged perspective view of one of the cells, showing one of the terminals and a conductive cap.

FIG. 3 is a partial enlarged perspective view of one of the cells 12, showing one of the terminals 16, 18 and a conductive cap 22. The cap 22 is configured to engage the post 20 to permit a conventional battery cable (not shown) to be electrically connected to the terminal 16, 18 by surroundingly engaging a clamp of the battery cable to the cap 22 in a conventional manner.

Figure 4:
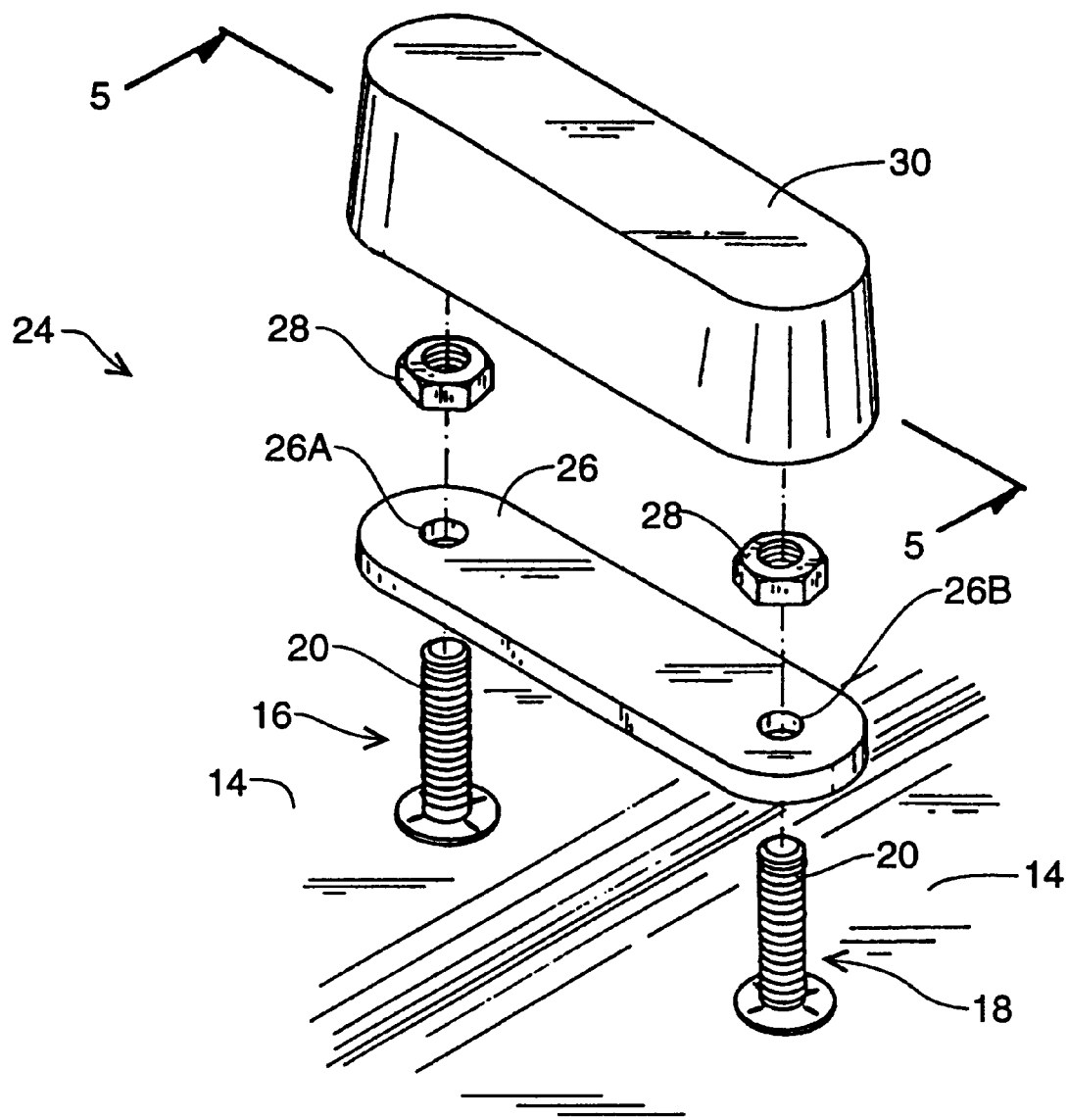
FIG. 4 is an enlarged perspective view of one of the cells, showing a connecting means for electrically connecting the cells together in series.

FIG. 4 is a partial enlarged perspective view of the cells 12, showing a connecting means 24 for electrically connecting the cells 12 together in series, by electrically connecting the positive terminal 16 of one of the cells 12 to the negative terminal 18 of the cell 12 adjacent thereto.

The connecting means 24 includes a conductive bar 26 having a first aperture 26A configured to receive one of the posts 20 of one of the cells 12, and a second aperture 26B configured to receive one of the posts 20 of an adjacent one of the cells 12. Nuts 28 threadedly engage the posts 20 to engage the conductive bar 26 securely to the posts 20. An insulated connector cap 30 is configured to cover the conductive bar 26 and the posts 20.

Figure 5:
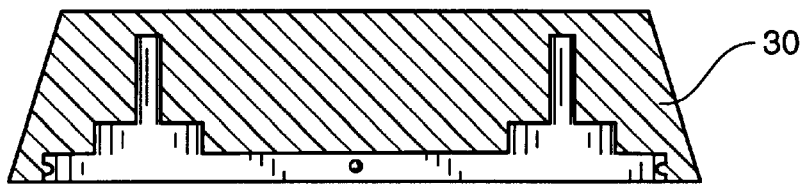
FIG. 5 is a cross-section of the connector cap taken along line 5—5 of FIG. 4.

FIG. 5 is a cross-section of the connector cap 30 taken along line 5—5 of FIG. 4, showing the interior of the connector cap 30 molded to fittingly engage the conductive bar 26, the posts 20 and the nuts 28.

Referring again to FIGS. 1–4, a holder 32 is configured to receive the cells 12 together in an adjoining manner wherein the positive terminal 16 of one cell 12 is adjacent the negative terminal 18 of an adjoining cell 12. The cells 12 are electrically connected together in series fashion using the connecting means 24 to form a single, multi-celled battery. The holder 32 includes a handle 32A at each end thereof. Instead of the holder 32, a strap (not shown), or tray (not shown) may be provided to adjoin the cells 12. Alternatively or in addition to the strap, tray or holder 32, the casings 14 may have an attachment means (not shown) for directly attaching one casing 14 to another.

Figure 6:
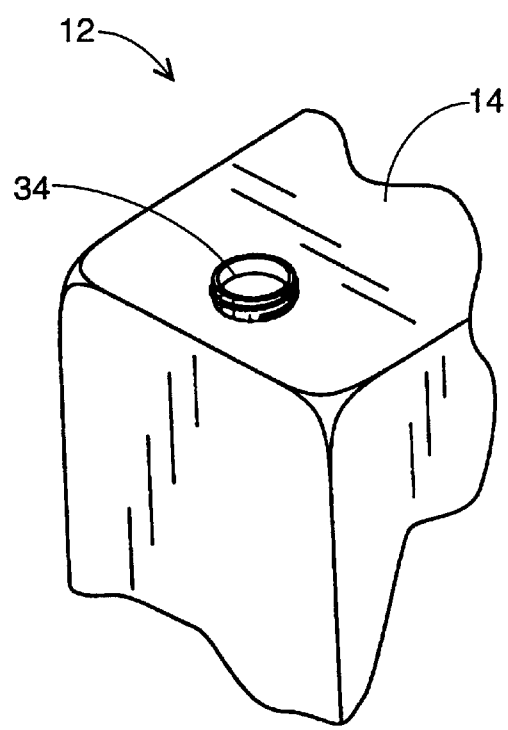
FIG. 6 is a partial enlarged perspective view of a cell, showing an opening in the casing through which electrolyte solution (not shown) within the cell may be replenished.

FIG. 6 is a partial enlarged perspective view of a cell 12, showing an opening 34 in the casing through which electrolyte solution (not shown) within the cell 12 may be replenished. Referring back to FIG. 1, each of the openings 34 is provided with a removable cap 34A.

Figure 7:
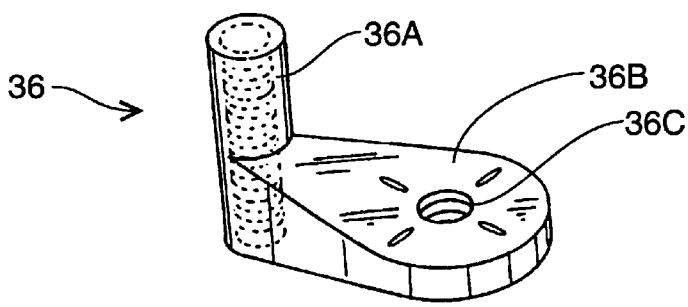
FIG. 7 is a perspective view of a side mount cable adapter.

FIG. 7 is a perspective view of a side mount cable adapter 36, comprising a threaded sleeve 36A configured to coveringly engage the post 20, and a connecting member 36B attached to the sleeve 36A. The connecting member 36B includes a threaded aperture 36C therein adapted to engage a threaded member of a conventional side mount battery cable (not shown). Thus, the present invention may be used with conventional top, or side mount battery cables.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A battery system comprising:
   a. a plurality of battery cells, each cell within a separate casing;
   b. each cell having two terminals comprising a positive terminal and a negative terminal;
   c. cable connection means for electrically connecting the terminals to battery cables;
   d. connecting means for electrically connecting the positive terminal of one of the battery cells to the negative terminal of another one of the battery cells;
   e. wherein each of the terminals comprises a post extending outwardly from the casing, and the cable connection means comprises:
      i. at least one side mount cable adapter comprising a sleeve configured to coveringly engage the post; and
      ii. a connecting member attached to the sleeve, the connecting member having an aperture therein adapted to engage a threaded member of a side mount battery cable.

2. The battery system of claim 1, wherein the connecting means comprises:
   a. a conductive bar having a first aperture configured to receive one of the posts of one of the cells, and a second aperture configured to receive one of the posts of an adjacent one of the cells;
   b. a securing means for securing the bar on the posts; and
   c. an insulated connector cap configured to cover the conductive bar and the posts received within the first and second apertures of the bar.

3. The battery system of claim 2, wherein the bar is planar, and the securing means comprises nuts configured to threadedly engage the posts.

4. The battery system of claim 1, wherein each casing includes an opening having a removable cap, an electrolyte solution within the cell being replaceable through the opening.

5. The battery system of claim 1, further comprising an adjoining means for adjoining the cells together wherein at least one of the terminals of each of the cells is adjacent one of the terminals of an adjacent one of the cells, whereby the cells may be electrically connected together in series fashion using the connecting means to form a single, multi-celled battery.

6. The battery system of claim 5, wherein each of the casings is substantially rectangular-box shaped, and wherein the adjoining means comprises a substantially rectangular holder having a bottom panel, four upwardly extended walls and a top opening, the holder configured to receive the cells together in an adjoining manner, the holder further including a carrying handle at each end thereof.

7. A battery system comprising:
   a. a plurality of battery cells, each cell within a separate, substantially rectangular box shaped casing;
   b. each cell having two terminals comprising a positive terminal and a negative terminal;
   c. each of the terminals comprising a post extending outwardly from the casing;
   d. a connecting means for electrically connecting the positive terminal of one of the battery cells to the negative terminal of another one of the battery cells;
   e. a side mount cable adapter comprising a sleeve conductive cap configured to coveringly engage the post, a connecting member attached to the sleeve, the connecting member having an aperture therein adapted to engage a threaded member of a side mount battery cable;
   f. the connecting means comprising a planar, conductive bar having a first aperture configured to receive one of the posts of one of the cells, and a second aperture configured to receive one of the posts of an adjacent one of the cells;
   g. the connecting means further comprising engaging members configured to engage the posts to secure the conductive bar to the posts;
   h. the connecting means further comprising an insulated connector cap configured to cover the conductive bar and the posts received within the first and second apertures of the bar;
   i. each casing including an opening having a removable cap, an electrolyte solution within the cell being replaceable through the opening; and
   j. a substantially rectangular holder having a bottom panel, four upwardly extended walls and a top opening, the holder configured to receive the cells together in an adjoining manner wherein at least one of the terminals of each of the cells is adjacent one of the terminals of an adjacent one of the cells, whereby the cells may be electrically connected together in series fashion using the connecting means to form a single, multi-celled battery.

* * * * *